United States Patent
Yang et al.

(10) Patent No.: US 11,296,524 B2
(45) Date of Patent: Apr. 5, 2022

(54) CHARGING STATION, CHARGING SYSTEM AND CHARGING METHOD FOR A DRONE

(71) Applicant: Coretronic Intelligent Robotics Corporation, Hsin-Chu (TW)

(72) Inventors: I-Ta Yang, Hsinchu County (TW); Hsu-Chih Cheng, Hsinchu County (TW); Ying-Chieh Chen, Hsinchu County (TW); Chi-Tong Hsieh, Hsinchu County (TW)

(73) Assignee: Coretronic Intelligent Robotics Corporation, Hsin-Chu (TW)

( * ) Notice: Subject to any disclaimer, the term of this patent is extended or adjusted under 35 U.S.C. 154(b) by 204 days.

(21) Appl. No.: 16/748,807

(22) Filed: Jan. 22, 2020

(65) Prior Publication Data

US 2020/0244087 A1    Jul. 30, 2020

(30) Foreign Application Priority Data

Jan. 28, 2019    (CN) .......................... 201910079507.3

(51) Int. Cl.
*H02J 7/00* (2006.01)
*B64C 39/02* (2006.01)
*B64D 45/08* (2006.01)

(52) U.S. Cl.
CPC .......... *H02J 7/0045* (2013.01); *B64C 39/024* (2013.01); *B64D 45/08* (2013.01)

(58) Field of Classification Search
CPC .............................. H02J 7/0045; B64C 39/024
USPC ......................................................... 320/109
See application file for complete search history.

(56) References Cited

U.S. PATENT DOCUMENTS

| 10,155,586 | B2 | 12/2018 | Liu et al. |
| 2017/0050749 | A1 | 2/2017 | Pilskalns |
| 2019/0168888 | A1* | 6/2019 | Kim ...................... B64C 39/024 |
| 2020/0108713 | A1* | 4/2020 | Bennie ..................... B60K 1/04 |

(Continued)

FOREIGN PATENT DOCUMENTS

| CH | 636566 | 6/1983 |
| CN | 103640706 | 3/2014 |

(Continued)

OTHER PUBLICATIONS

"Office Action of China Counterpart Application", dated Apr. 6, 2021, p. 1-p. 13.

*Primary Examiner* — Suchin Parihar
(74) *Attorney, Agent, or Firm* — JCIPRNET

(57) ABSTRACT

A charging station, a charging system and a charging method for a drone are provided. The charging station adapted to park a drone for charging includes a parking ramp, a pair of charging plates, a pair of protecting covers, and at least one actuating device. The parking ramp has a parking surface and a bottom surface. The drone is parked on the parking surface having at least two openings. The charging plates are fixed to the bottom surface. The protecting covers are disposed between the bottom surface of the parking ramp and the charging plates. The protecting covers cover the charging plates at the openings. The actuating device is fixed to the bottom surface and connected to the protecting covers. When the drone stands still on the parking surface, the actuating device drives the protective covers to move relative to the charging plates to expose the charging plates.

18 Claims, 10 Drawing Sheets

(56) References Cited

U.S. PATENT DOCUMENTS

| | | | |
|---|---|---|---|
| 2020/0239160 A1* | 7/2020 | Cheng | B64C 39/024 |
| 2021/0031947 A1* | 2/2021 | Wankewycz | B64D 27/24 |
| 2021/0053677 A1* | 2/2021 | Passley | B64F 1/007 |
| 2021/0107682 A1* | 4/2021 | Kozlenko | B64F 1/12 |
| 2021/0122497 A1* | 4/2021 | Robertson, Jr. | B60L 53/51 |
| 2021/0163135 A1* | 6/2021 | Shin | H01F 27/366 |
| 2021/0380019 A1* | 12/2021 | Livingston | B60L 53/30 |
| 2021/0405655 A1* | 12/2021 | Yi | G05D 1/0669 |

FOREIGN PATENT DOCUMENTS

| | | |
|---|---|---|
| CN | 105391155 | 3/2016 |
| CN | 205178593 | 4/2016 |
| CN | 106005465 | 10/2016 |
| CN | 106428614 | 2/2017 |
| CN | 106542109 | 3/2017 |
| CN | 206302214 | 7/2017 |
| CN | 206437232 | 8/2017 |
| CN | 107980753 | 5/2018 |
| CN | 108016629 | 5/2018 |
| KR | 101822386 | 1/2018 |

* cited by examiner

CHARGING STATION, CHARGING SYSTEM AND CHARGING METHOD FOR A DRONE

CROSS-REFERENCE TO RELATED APPLICATION

This application claims the priority benefit of China application serial no. 201910079507.3, filed on Jan. 28, 2019. The entirety of the above-mentioned patent application is hereby incorporated by reference herein and made a part of this specification.

BACKGROUND

Field of the Invention

The invention relates to a drone and more particularly, to a charging station, a charging system and a charging method for a drone.

Description of Related Art

A drone is a new emerging operating tool for business and industrial applications and is mainly applied in outdoor automatic flight patrol. Currently, an optical recognition system is commonly used to position a landing position when the drone flies back to a parking ramp and land after completing a task, so as to land accurately. For example, the optical recognition system may include techniques, such as an infrared (IR) camera technique and a computer vision (CV) technique. However, charging plates disposed on the parking ramp are made of a metal material. Thus, the charging plates reflect ambient light (e.g., the sunlight), which may cause the drone not to normally land due to misjudgment in the optical recognition when landing or extending the time required for landing, or even may cause flight safety concerns.

At present, there are solutions to solve the issues mentioned above.

1. A black conductive paint is coated on the charging plates. Such method may prevent a light reflection issue, but may cause increased impedance to the charging plates to affect charge efficiency, a coating method thereof is non-charging plating using a material having poor adherence, and re-spraying is required per month, which is time and labor consuming.

2. A usage period is limited, and positioning is performed repeatedly for landing. A phenomenon of intensive light reflection may generally occur at noon time, and thus, the task has to be performed by avoiding the time period from 11:00 to 14:00. If the recognition issue still occurs, a re-landing and aligning procedure is performed. This method may cause the drone to fail to well utilize characteristics of 24-hour automatic execution of patrol tasks and may cause potential crisis to the drone due to the multiple positioning for landing.

Moreover, at present, after the drone is parked on the parking ramp, an aligning and centralizing process is performed for charging (because the smaller the charging plates are, the more the light reflection interference can be avoided). However, this centralizing process usually leads to scratches to the charging plates by the charging stands of the drone, and after a long time, a gold plating layer is worn out to expose a copper layer. As copper oxidation causes copper chloride, the charging impedance is increased, and charge efficiency is degraded, which results in a shortened lifespan of the charging plates or the need for regular maintenance. Currently, such phenomenon is mitigated by increasing the thickness of the gold plating layer, which leads to the increase of maintenance cost.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY

The application provides a charging station for a drone to land accurately.

The invention provides a charging system capable of maintaining a charge efficiency, reducing maintenance cost and extending a lifespan of charging plates.

The invention provides a charging method capable of fully charging a drone.

To achieve one, part, or all of the objectives aforementioned or other objectives, a charging station of the invention is adapted to park a drone to charge. The charging station includes a parking ramp, a pair of charging plates, a pair of protecting covers, and at least one actuating device. The parking ramp has a parking surface and a bottom surface, the drone is parked on the parking surface having at least two openings. The charging plates are fixed to the bottom surface. The protecting covers are disposed between the bottom surface of the parking ramp and the charging plates and cover the charging plates at the openings. The actuating device is fixed to the bottom surface and connected to the protecting covers. When the drone stands still on the parking surface, the actuating device drives the protecting covers to move relative to the charging plates to expose the charging plates, so that at least two charging stands of the drone contact the charging plates to charge.

To achieve one, part, or all of the objectives aforementioned or other objectives, a charging system for a drone of the invention includes a drone and a charging station. The drone has an infrared receiver, and the charging station includes a parking ramp, a pair of charging plates, a pair of protecting covers, at least an actuating device and an infrared transmitter. The parking ramp has a parking surface and a bottom surface, and the parking surface has at least two openings. The charging plates are fixed to the bottom surface. The protecting covers are disposed between the bottom surface of the parking ramp and the charging plates. The protecting covers respectively cover the charging plates at the at least two openings. The actuating device is fixed to the bottom surface and connected to the protecting covers. The infrared transmitter is disposed on the parking ramp, when the drone lands on the parking ramp after the infrared receiver of the drone receives the light signal emitted by the infrared transmitter, and when the drone stands still on the parking surface, the actuating device drives the protecting covers to move relative to the charging plates to expose the charging plates, so that at least two charging stands of the drone contact the charging plates to charge.

To achieve one, part, or all of the objectives aforementioned or other objectives, a charging method is adapted to a charging system for a drone and a charging station. The drone has an infrared receiver, and the charging station includes a parking surface having at least two openings, a bottom surface, a pair of charging plates fixed to the bottom surface, a pair of protecting covers disposed between the bottom surface and the pair of charging plates, at least one actuating device fixed to the bottom surface and connected to the pair of protecting covers and an infrared transmitter. The charging method for the drone at least includes the following steps. The protecting covers respectively cover the charging plates at the at least two openings. The drone is land on the parking surface by receiving a light signal emitted by the infrared transmitter, the infrared transmitter is disposed on the charging station. When the drone stands still on the parking surface, the actuating device drives the protecting covers to move relative to the charging plates to expose the charging plates. The charging station charges the drone through the charging plates contacting at least two charging stands of the drone.

A charging station of the invention is adapted to park a drone to charge. The charging station includes a parking ramp, a pair of charging plates, a protecting cover and at least one actuating device. The parking ramp has a parking surface and a bottom surface, and the parking surface has at least two openings. The charging plates are fixed to the bottom surface. The protecting cover is disposed between the bottom surface of the parking ramp and the pair of charging plates. The protecting cover covers the charging plates at the openings. The actuating device is fixed to the bottom surface and connected to the protecting cover. When the drone stands still on the parking surface, the actuating device drives the protecting covers to move relative to the charging plates to expose the charging plates, so that at least two charging stands of the drone contact the charging plates to charge.

To sum up, the charging station, the charging system and the charging method for the drone provided by the invention can solve issues, such as the reflection interference by the charging plates and the low charge efficiency, during the landing of the drone.

To make the above features and advantages of the invention more comprehensible, embodiments accompanied with drawings are described in detail below.

Other objectives, features and advantages of the invention will be further understood from the further technological features disclosed by the embodiments of the invention there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Both the foregoing and other technical descriptions, features and advantages of the invention are intended to be described more comprehensively by providing a preferred embodiment accompanied with drawings hereinafter. The language used in the directions such as up, down, left, right, front, back or the like in the reference drawings is regarded in an illustrative rather than in a restrictive sense. Thus, the language is used for the directions, but not intended to limit the scope of the invention.

Figure 1:
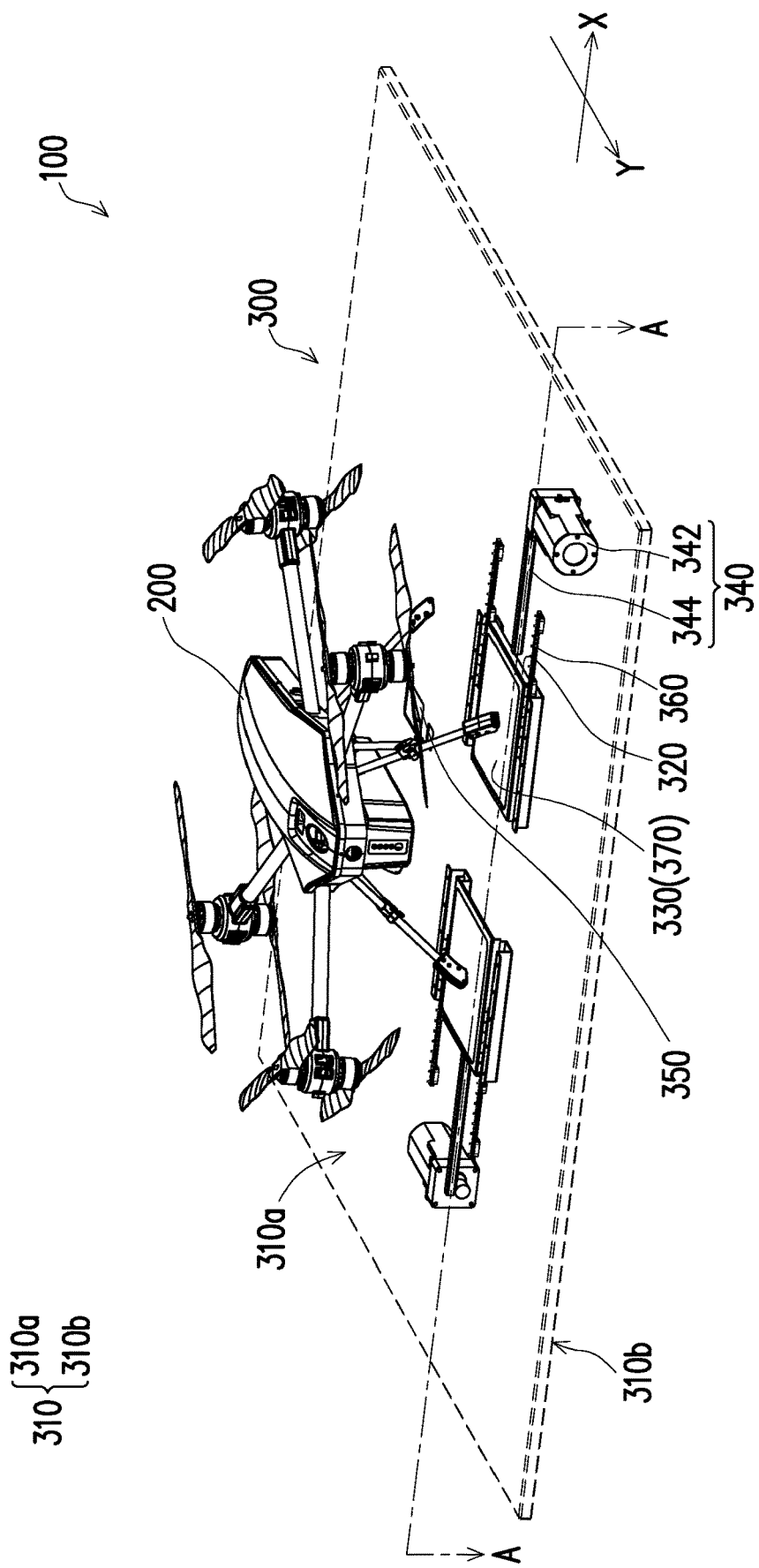
FIG. 1 is a schematic diagram illustrating a drone charging system according to an embodiment of the invention.
Figure 2:
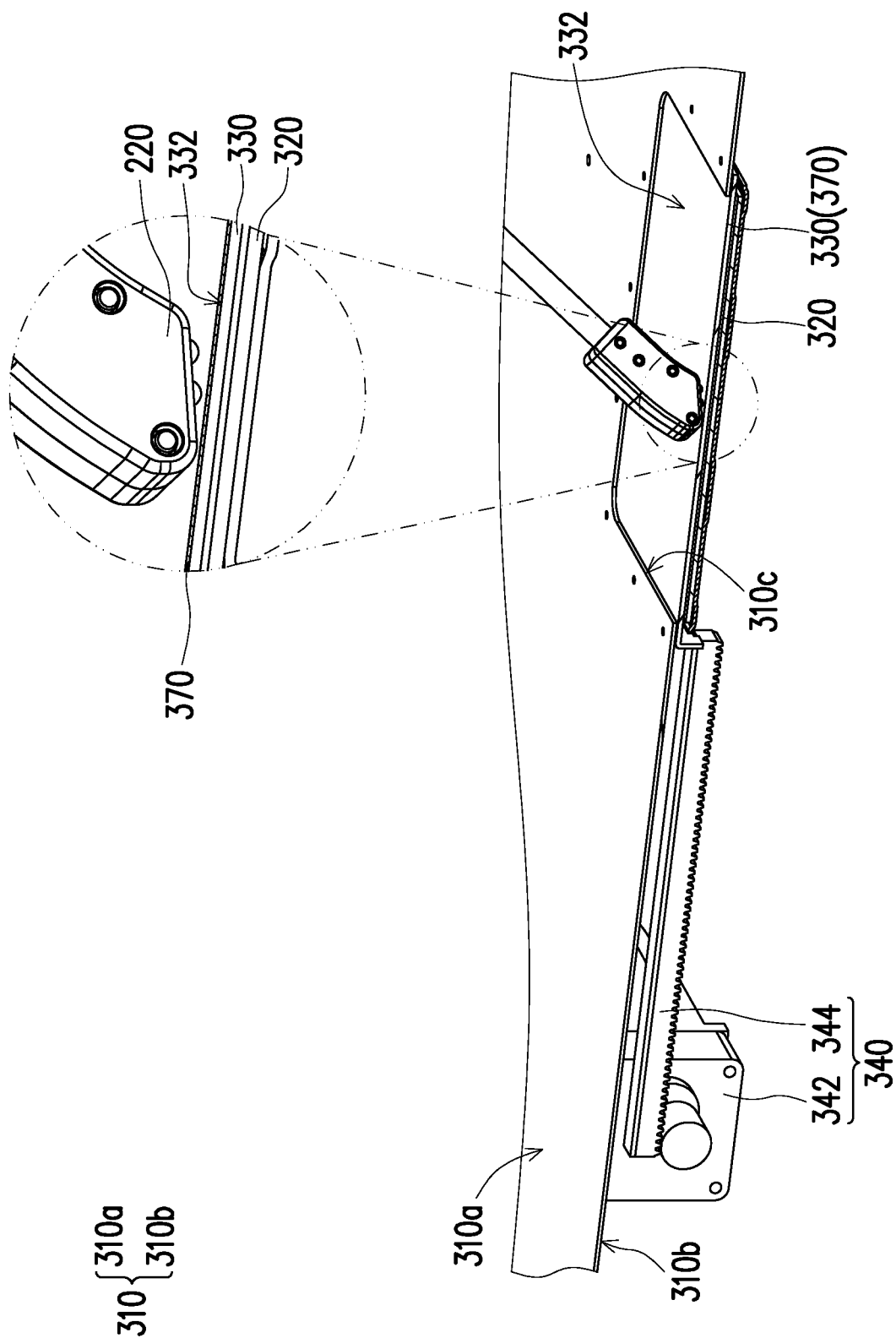
FIG. 2 is a schematic diagram along a cross-sectional line A-A of FIG. 1.
Figure 3:
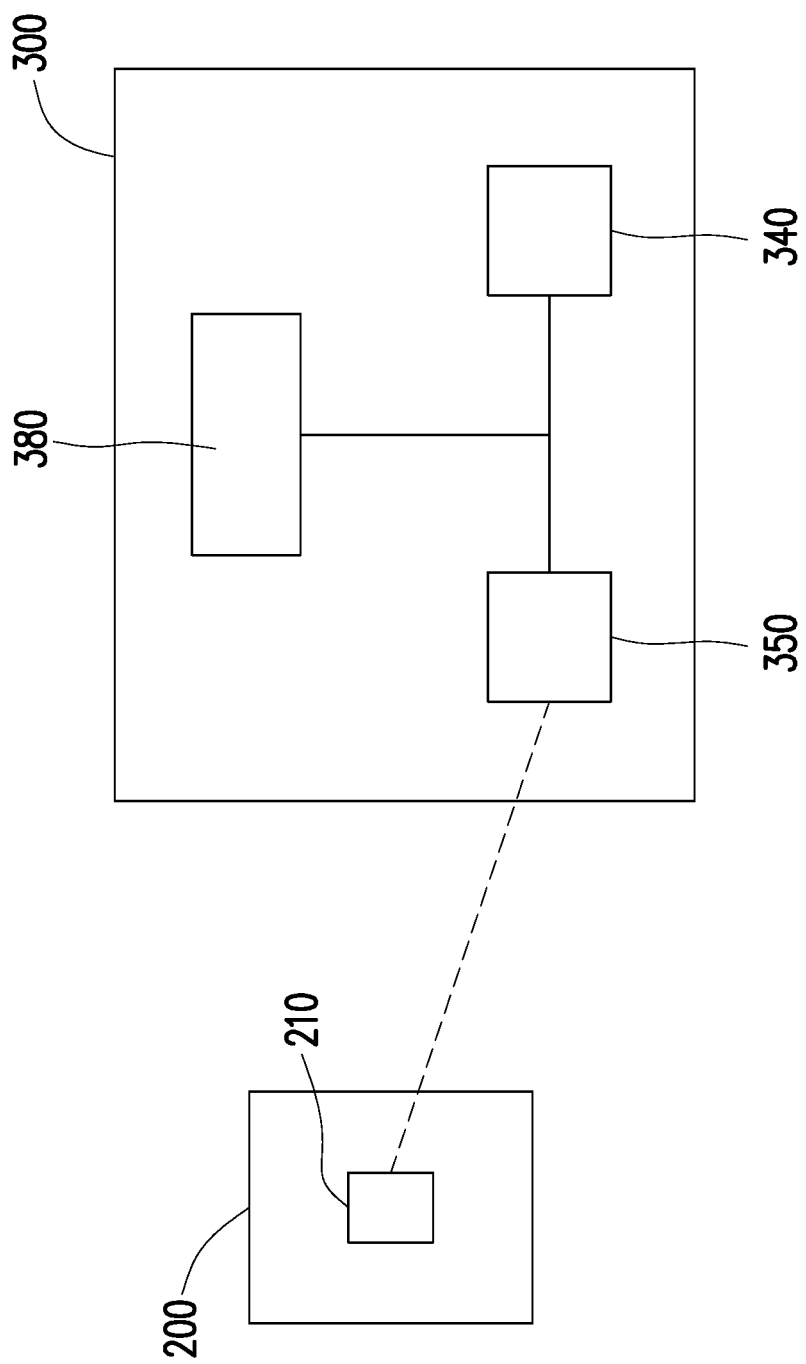
FIG. 3 is a schematic circuit diagram of the drone charging system according to an embodiment of the invention.

Referring to FIG. 1, FIG. 2 and FIG. 3, FIG. 1 is a schematic diagram illustrating a drone charging system according to an embodiment of the invention, FIG. 2 is a schematic diagram along a cross-sectional line A-A of FIG. 1, and FIG. 3 is a schematic circuit diagram of the drone charging system according to an embodiment of the invention.

A drone charging system 100 includes a drone 200 and a charging station 300, and the drone 200 is adapted to be parked on the charging station 300 to charge. Specifically, in the drone charging system 100, the drone 200 has an infrared receiver 210, and the charging station 300 includes a parking ramp 310, a pair of charging plates 320, a pair of protecting covers 330, at least an actuating device 340 and an infrared transmitter 350. The parking ramp 310 has a parking surface 310a for the drone 200 to be parked thereon and a bottom surface 310b facing in an opposite direction to the parking surface 310a, and the parking surface 310a has at least two openings 310c. The charging plates 320 are fixed to the bottom surface 310b and separated from the bottom surface 310b by a small distance. The protecting covers 330 are disposed between the bottom surface 310b of the parking ramp 310 and the charging plates 320, the protecting covers 330 are respectively correspondingly disposed to the openings 310c to cover the charging plates 320, and the protecting covers 330 may move relative to the openings 310c to expose the charging plates 320. Referring to FIG. 2, the actuating device 340 is fixed to the bottom surface 310b and connected to the protecting cover 330, so that the actuating device 340 may drive the protecting cover 330 to move, and the protecting cover 330 covering the charging plate 320 may move relative to the charging plate 320 and gradually depart from the charging plate 320, thereby exposing the charging plate 320 from the opening 310c. The infrared transmitter 350 is disposed on the parking ramp 310 of the charging station 300 and configured to transmit an infrared light signal to the infrared receiver 210 of the drone 200 to control and guide the drone 200 to land.

To be detailed, the actuating device 340 includes an actuator 342 and a linking rod 344, the actuator 342 may use a motor or a pneumatic cylinder according to an actual demand, the linking rod is connected between the actuator 342 and the protecting cover 330, and thus, when the actuator 342 drives the linking rod 344 to move, the linking rod 344 may drive the protecting cover 330 to move relative to the opening 310c and the charging plate 320. In an embodiment of the invention, the number of the linking rod 344 between one actuator 342 and its corresponding protecting cover 330 is at least one, and the actuator 342 drives the linking rod 344 to extend or retract along a straight line, but the invention is not limited thereto. For example, the actuator 342 drives the linking rod 344 to extend or retract along an X axis, such that the protecting cover 330 corresponding to the charging plate 320 may move relative to the charging plate 320 and gradually get close to or depart from the charging plate 320 to drive the protecting cover 330 cover or expose the charging plate 320.

The charging station 300 further includes two pairs of support slide rails 360 fixed to the bottom surface 310b, each of the support slide rails 360 correspondingly supports the protecting cover 330, and the protecting cover 330 is driven by the actuating device 340 on the support slide rail 360 to move relative to the charging plate 320. The support slide rail 360 may be designed in collaboration with the driving linking rod 344 and is not limited to linearly and stretchably move on the XY plane. The support slide rail 360 may be changed to have a tilt angle with respect to the parking surface 310a, such that the protecting cover 330 may move relative to the charging plate 320 and gradually become higher or lower than the charging plate 320.

In order to provide a preferable support force, the protecting cover 330 may be made of a metal, and since the metal usually have a high reflectivity, a light-absorbing layer 370 may be further disposed on a top surface 332 of the protecting cover 330 to reduce a reflectivity of the top surface of the protecting cover 330 facing the parking surface 310a. The light-absorbing layer 370 may be made of any light-absorbing material or low reflectivity material, and any material capable of preventing reflection of the ambient light falls within the scope of the invention. In an embodiment of the invention, the protecting cover 330 may be made of a highly rigid non-metallic material. In another embodiment of the invention, the protecting cover 330 may be made of a flexible material. In an embodiment of the invention, the material of the protecting cover 330 and the material of the light-absorbing layer 370 may be the same.

The drone charging system 100 further includes a control unit 380 electrically connected to the infrared transmitter 350 and the actuating device 340. The infrared transmitter 350 is configured to confine that charging stands 220 of the drone 200 are located in the openings 310c, and the actuating device 340 is configured to drive the protecting covers 330 to move relative to the charging plates 320 to expose the charging plates 320. The control unit 380 is configured to control the infrared transmitter 350 to transmit the infrared light signal to the infrared receiver 210 of the drone 200 and further control the actuating device 340 to operate. In the present embodiment, the control unit 380 may sequentially control the infrared transmitter 350 and the actuating device 340. For example, the control unit 380 may first control the infrared transmitter 350 and then enable the actuating device 340 after confirming that the drone 200 is parked at a correct position.

In addition, after the drone 200 is parked on the parking surface 310a of the parking ramp 310 of the charging station 300, the control unit 380 may further confirm a position of the drone 200 through the infrared transmitter 350, and after confirming that the charging stands 220 of the drone 200 are located in the openings 310c, the control unit 380 further drives the protecting covers 330 to move, such that the charging plates 320 which are covered by the protecting covers 330 are exposed from the openings 310c, and the charging stands 220 directly contact the charging plates 320 to charge the charging stands 220 of the drone 200. In an embodiment of the invention, the control unit 380 may further confirm the position and an orientation of the drone 200 through the infrared transmitter 350, such that after determining that the charging stands 220 of the drone 200 are located in the openings 310c, the control unit 380 further drives the protecting covers 330 to move, thereby exposing the charging plates 320 from the openings 310c to charge the charging stands 220 of the drone 200.

Hereinafter, a charging method for the drone 200 is described with reference to the accompanying drawings and based on the drone charging system 100 described above. FIG. 4 through FIG. 8 are schematic diagrams illustrating the flow that the drone is charged by the charging station.

Figure 4:
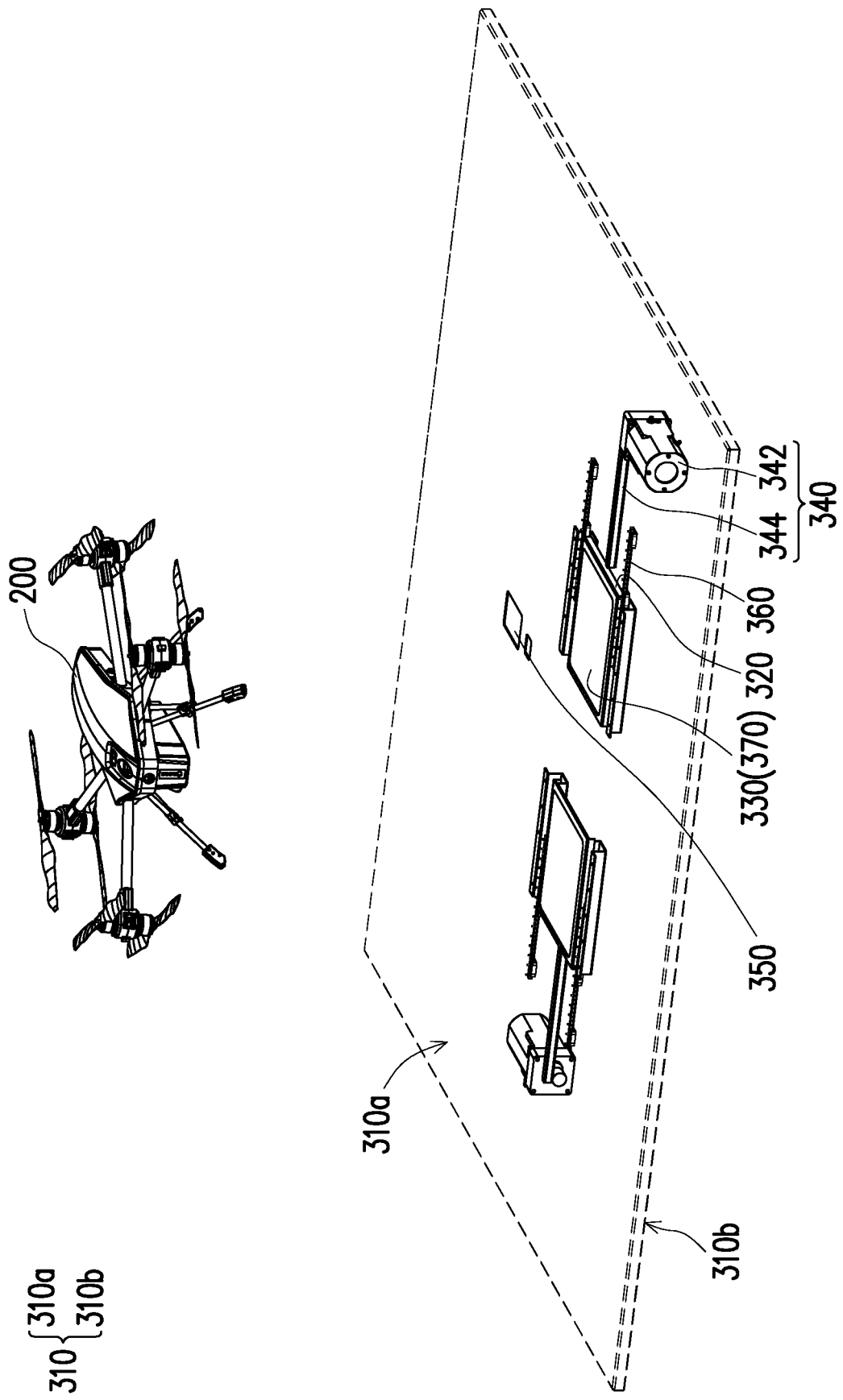
FIG. 4 is a schematic diagram illustrating that the drone is about to land on the charging station after finishing a patrol task according to an embodiment of the invention.

Referring to FIG. 4, when the drone 200 is about to return to the charging station 300 after finishing a patrol task, the control unit 380 of the drone charging system 100 controls the infrared transmitter 350 disposed on the charging station 300 to emit a light signal to guide the drone 200 to land on the parking surface 310a of the parking ramp 310. In this circumstance, the protecting covers 330 respectively cover the charging plates 320.

As the top surfaces 332 of the protecting covers 330 provided with the light-absorbing layers 370 thereon, the protecting covers 330 cover the charging plates 320, the charging plates 320 does not reflect the sunlight even in intensive sunlight at noon time (i.e., from 11:00 to 14:00). Furthermore, as the light-absorbing layer 370 is disposed on the top surface 332 of each of the protecting covers 330, the protecting covers 330 neither reflect the sunlight. In this way, the infrared receiver 210 of the drone 200 may preferably receive the light signal emitted by the infrared transmitter 350 and is guided to land on the parking surface 310a of the parking ramp 310.

Figure 5:
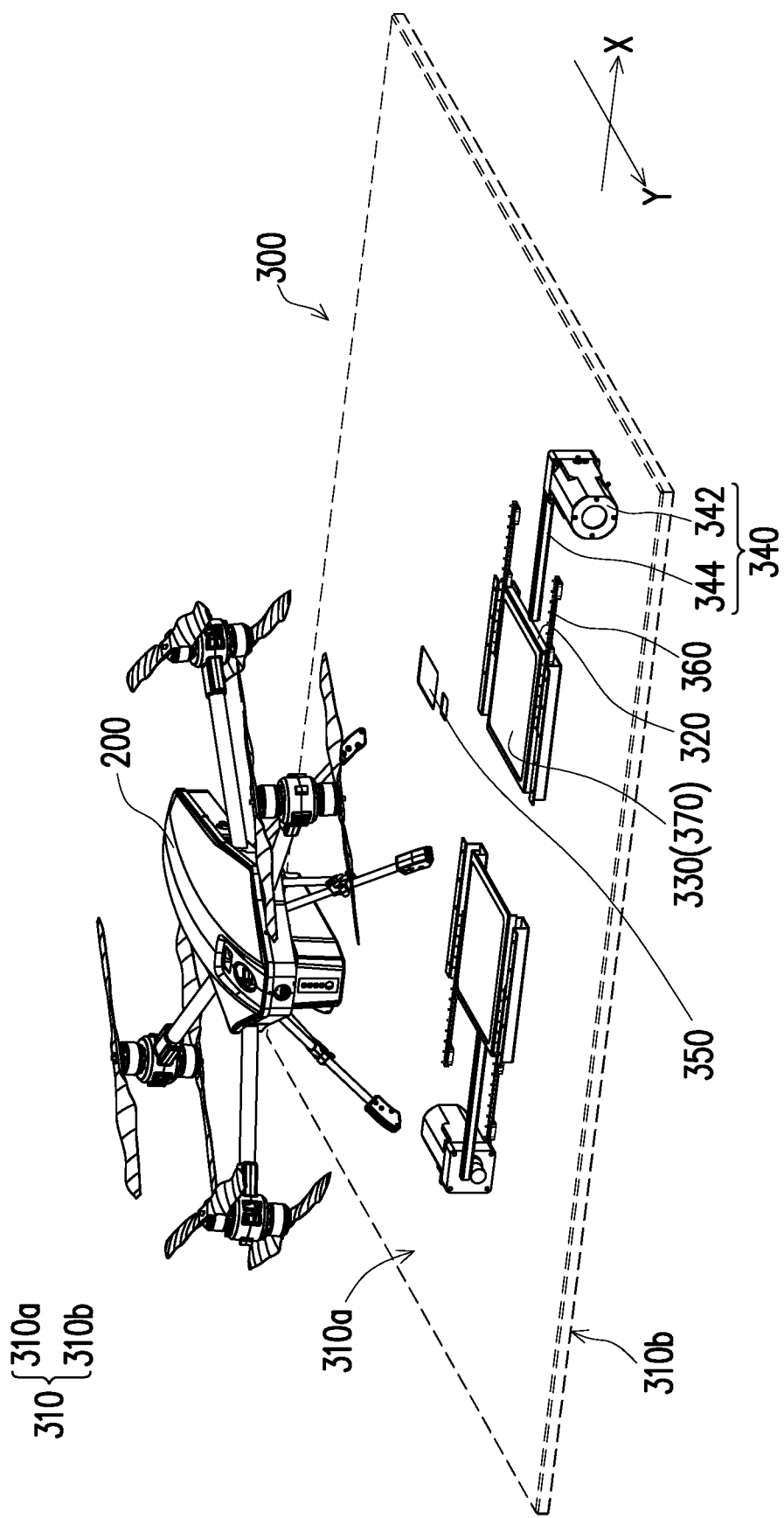
FIG. 5 is a schematic diagram illustrating that the drone lands at an arbitrary first position on the parking surface of the parking ramp according to an embodiment of the invention.

As illustrated in FIG. 5, the drone 200 has landed on the parking surface 310a of the parking ramp 310, however, the drone 200 usually does not land on a position totally accurately corresponding to the openings 310c of the parking surface 310a, but on an arbitrary first position of the parking ramp 310, instead.

Figure 6:
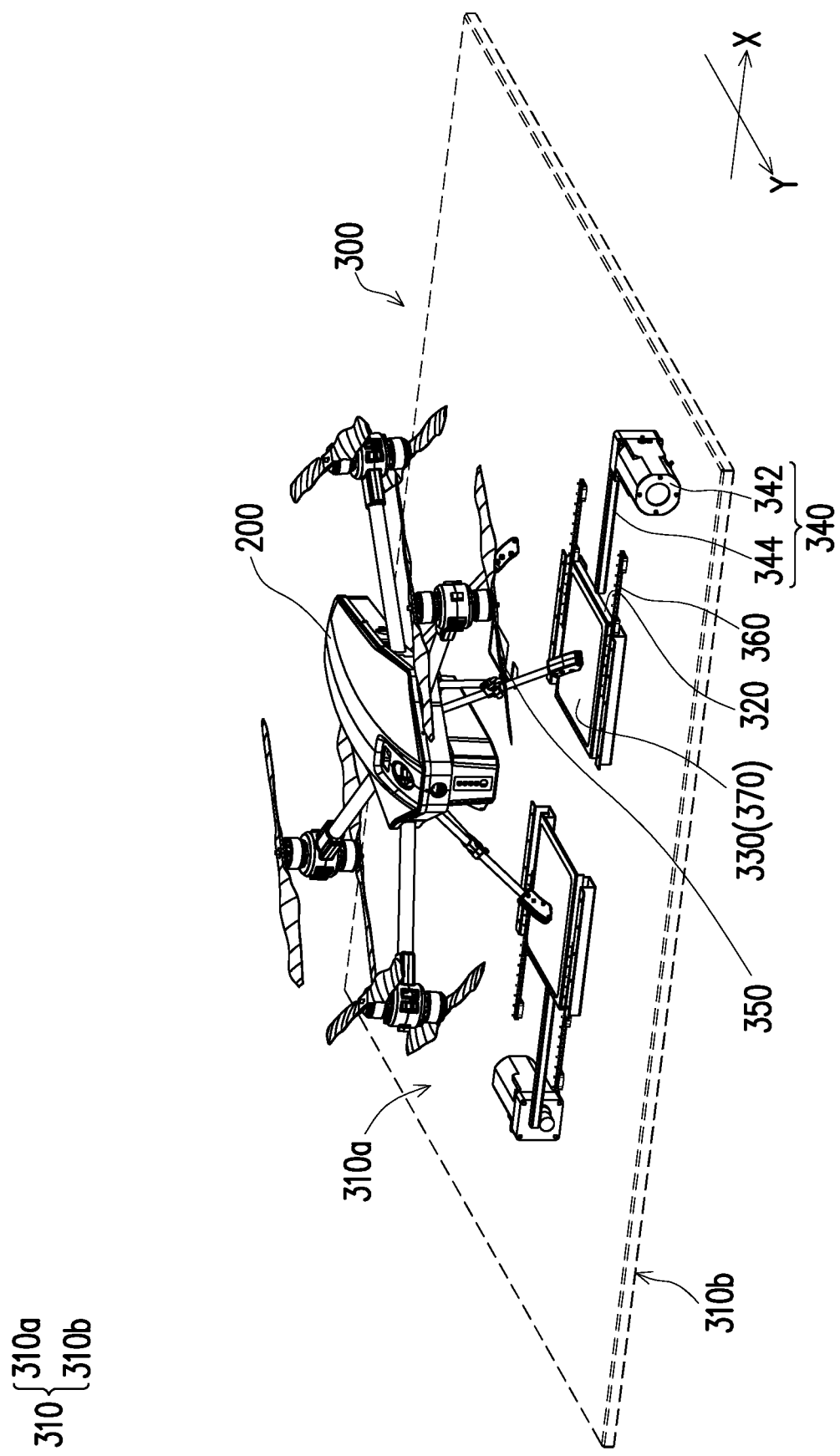
FIG. 6 is a schematic diagram illustrating that the drone is pushed to a charging position on the parking surface of the parking ramp according to an embodiment of the invention.

Therefore, the drone charging system 100 further includes a pushing device (not illustrated) to push the drone 200 from the arbitrary first position to a charging position. After the drone 200 is pushed along a first direction (e.g., the X-direction) to a second position by the pushing device, the drone 200 is further pushed along a second direction (e.g., the Y-direction) to the charging position by the pushing device. Referring to FIG. 6, FIG. 6 is a schematic diagram illustrating that the drone is pushed to the charging position on the parking surface of the parking ramp according to an embodiment of the invention.

It is additionally mentioned that the charging station 300 confirms a current position of the drone 200 and determines whether the drone 200 arrives the charging position through the infrared transmitter 350. In an embodiment of the invention, the control unit 380 may be further connected to the pushing device and control the pushing device to push the drone 200 to the charging position based on a current position of the drone 200 which is returned by the infrared transmitter 350. In addition, the charging position refers to at least two of the charging stands of the drone 200 being correspondingly located in two of the openings 310c and being parked on the top surfaces 332 of the protecting covers 330.

Figure 7A:
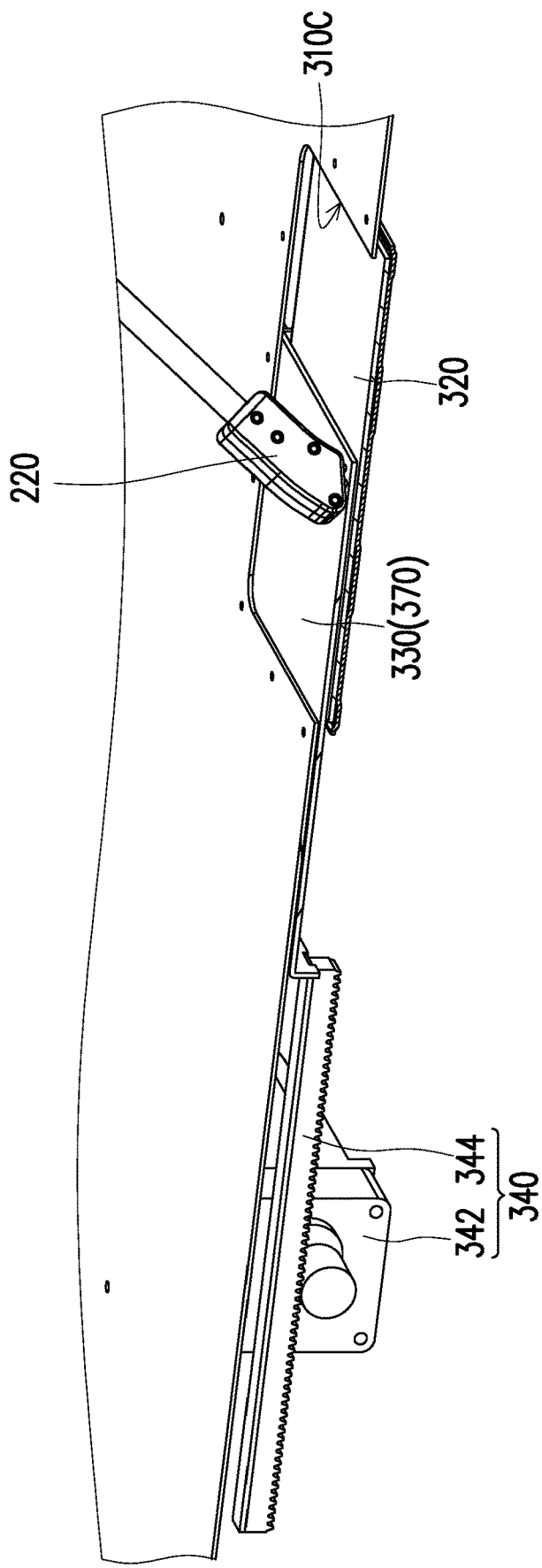
FIG. 7A is a schematic diagram illustrating that the actuating device drives the protecting cover to move relative to the charging plate according to an embodiment of the invention.
Figure 7B:
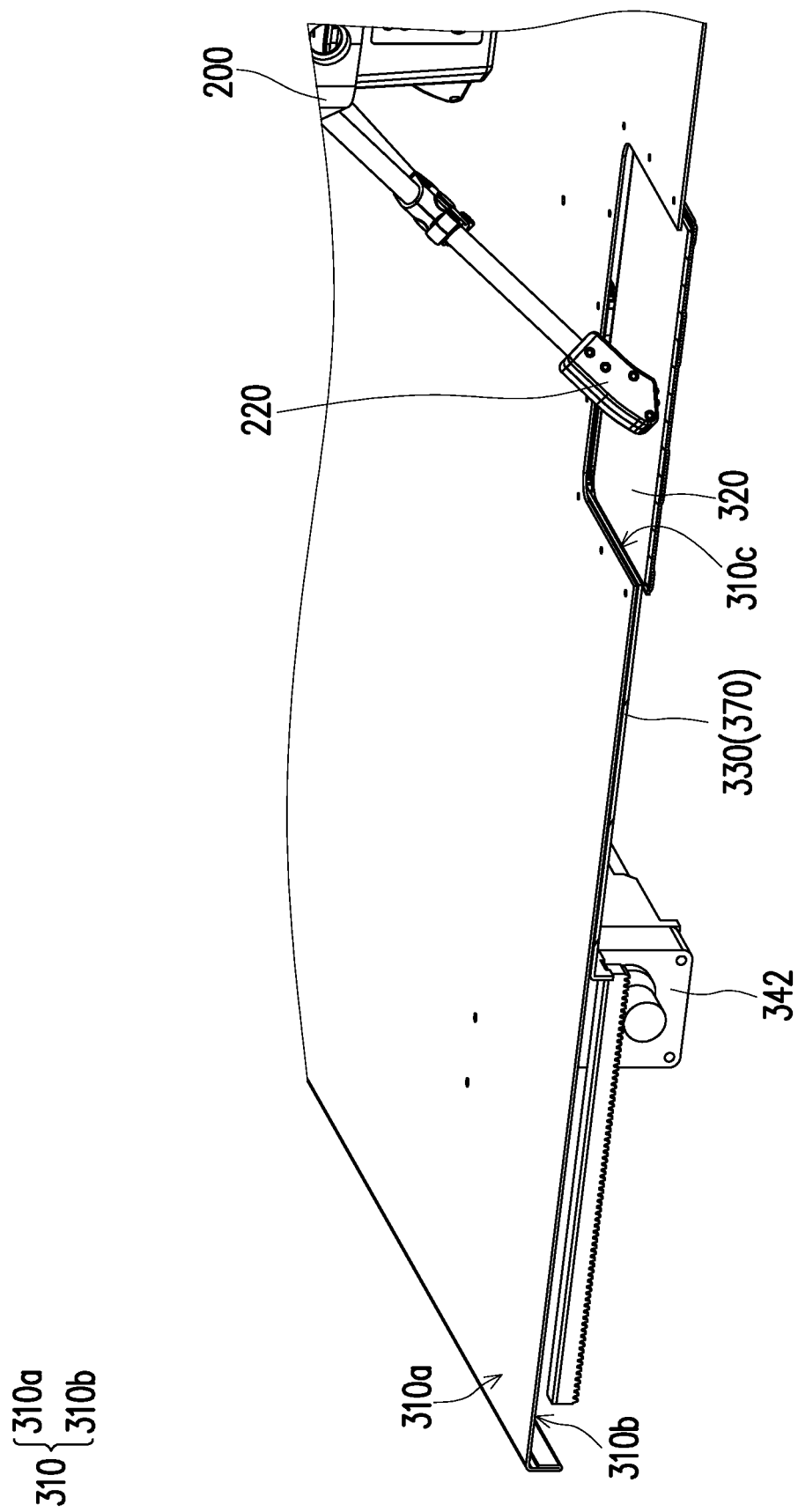
FIG. 7B illustrates a schematic diagram illustrating that the charging plate is exposed from the openings according to an embodiment of the invention.

Then, as illustrated in FIG. 7A and FIG. 7B, when confirming that the drone 200 is located at the charging position, the control unit 380 controls the actuating device 340, such that the actuator 342 operates to drive the linking rod 344 to retract back, and the protecting cover 330 connected to the linking rod 344 is driven by the linking rod 344 to move on the support slide rail 360 and relatively departs away from the charging plate 320, thereby, exposing the charging plate 320 from the opening 310c and gradually exposing the charging plate 320 completely from the opening 310c.

Figure 8:
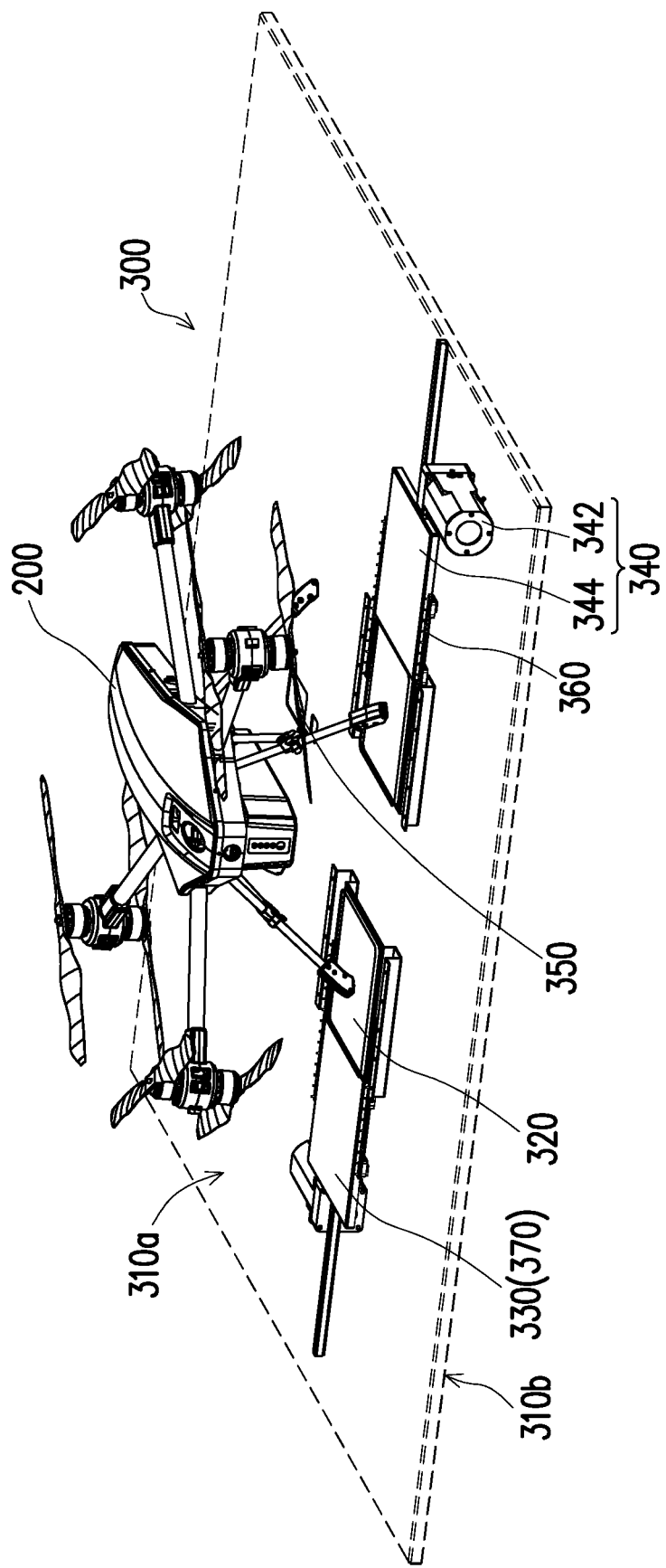
FIG. 8 is a schematic diagram illustrating that the drone is charged through the charging plates contacting the charging stands according to an embodiment of the invention.

In this circumstance, the charging stand 220 of the drone 200 originally parked on the top surface 332 of the protecting cover 330 falls on the charging plate 320 since the protecting cover 330 is moved away. Thus, the charging station 300 charges the drone 200 through the charging plate 320 contacting the charging stand 220 of the drone 200. Referring to FIG. 8, FIG. 8 is a schematic diagram illustrating that the drone is charged through the charging plates contacting the charging stands according to an embodiment of the invention.

In the present embodiment, two actuating devices 340 are disposed, and the two actuators 342 drive the linking rods 344 to respectively drive the corresponding protecting covers 330 to move opposite, for example, the X-direction and the –X-direction, to each other in the first direction (e.g., the X-direction). The invention is not limited thereto, and a user may design the number of the actuators 342, the driving directions of the linking rod 344 or the number of the openings.

Figure 9:
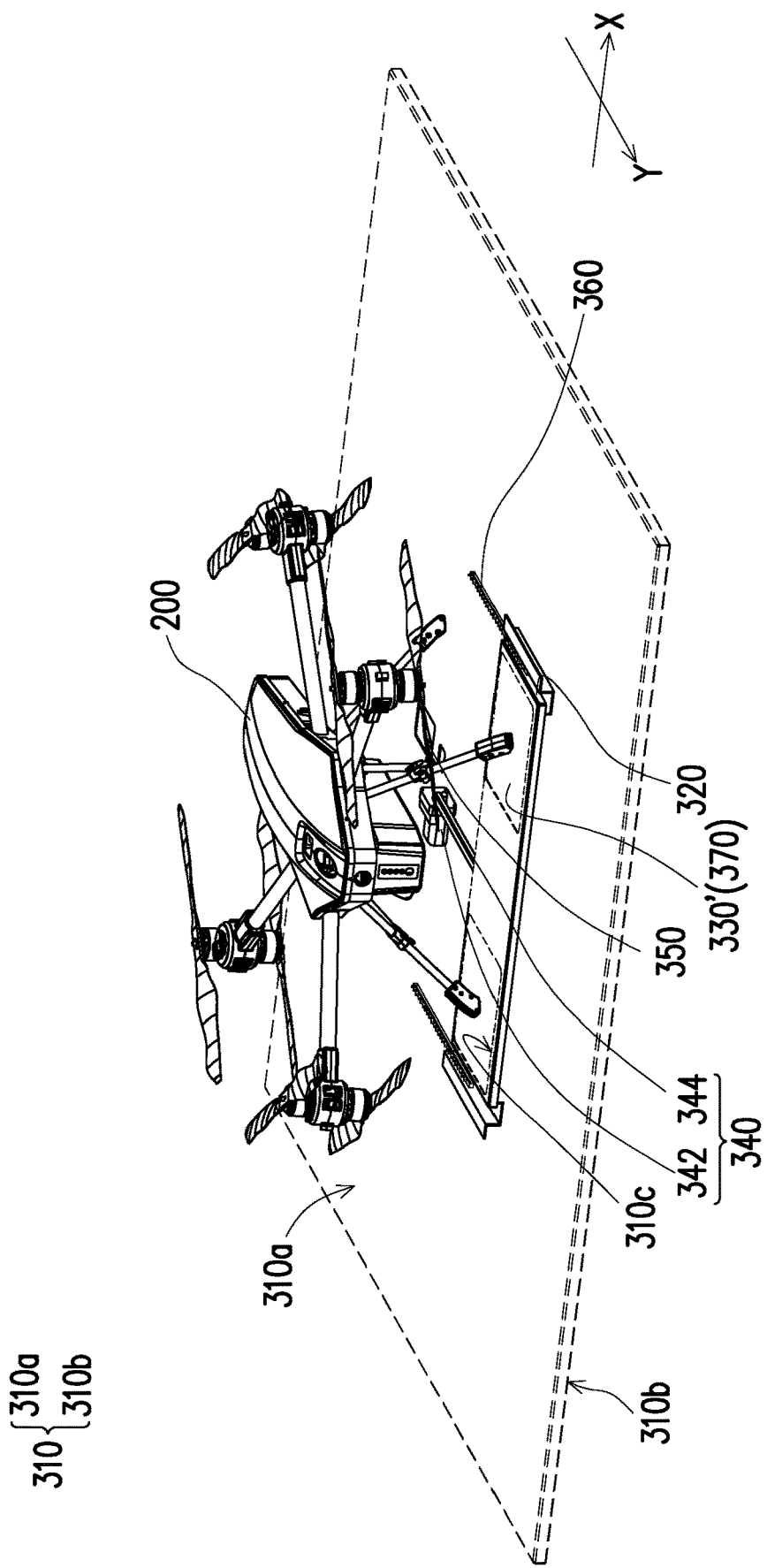
FIG. 9 is a schematic diagram illustrating a charging system for a drone according to another embodiment of the invention.

In the embodiment as illustrated in FIG. 9, the actuating device 340 may be disposed as only one, and a protecting cover 330' may also be disposed as one. The protecting cover 330' is sufficiently large, so as to simultaneously cover the two charging plates 320 in the two openings 310c. When the control unit 380 (illustrated in FIG. 3) controls the actuating device 340 to operate, the actuator 342 drives the linking rod 344 to drive the protecting cover 330' to move in the second direction (e.g., the Y-direction), such that the protecting covers 330' moves relative to the openings 310c, thereby exposing the charging plates 320 from the two openings 310c. Corresponding to the change of the disposition of the protecting cover 330', the relative disposition of the rest of the elements may be probably changed as well.

It is to be mentioned that the drone 200 of the present embodiment is not limited to an aircraft flying in the air, and the drone 200 may also be an unmanned autonomous vehicle.

Based on the above, the charging station, the charging system and the charging method for the drone of the invention can have at least the following advantages.

1. The charging plates are covered by the protecting covers having the light-absorbing layers disposed on the top surfaces thereof, such that the issue of the reflection interference by the charging plates during the landing process of the drone can be solved to well utilize the capability of the drone for 24-hour patrol tasks.

2. The light-absorbing layers are disposed on the top surfaces of the protecting covers, such that no conductive paint has to be additionally coated on the charging plates, such that cost and human resource required for the use of and repeatedly spraying the conductive paint can be saved.

3. After the charging stands of the drone are moved into the openings on the surface of the parking surface, the protecting covers are moved relative to the charging plates only after the drone is located on the charging position. Thus, the issue that the charging efficiency is degraded due to the increased impedance of the charging plates caused by the charging plates scratched by the charging stands during the centralizing and aligning process of the drone can be solved. In the words, in comparison with the related art, the invention can effectively maintain the charge efficiency of the charging plates.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A charging station, adapted to park a drone for charging, comprising:
    a parking ramp, having a parking surface and a bottom surface, wherein the drone is adapted to be parked on the parking surface, and the parking surface has at least two openings;
    a pair of charging plates, fixed to the bottom surface;
    a pair of protecting covers, disposed between the bottom surface of the parking ramp and the pair of charging plates, wherein the pair of protecting covers respectively cover the pair of charging plates at the at least two openings; and
    at least one actuating device, fixed to the bottom surface and connected to the pair of protecting covers,
    wherein after the drone stands still on the parking surface and at least two charging stands of the drone contact the pair of protecting covers, the at least one actuating device drives the pair of protecting covers to move relative to the pair of charging plates to expose the pair of charging plates, so that the at least two charging stands of the drone contact the pair of charging plates to charge.

2. The charging station according to claim 1, wherein the at least one actuating device comprises an actuator and a linking rod, and the linking rod is connected between the actuator and the protecting covers.

3. The charging station according to claim 2, wherein the actuator is a motor or a pneumatic cylinder.

4. The charging station according to claim 1, further comprising:
    two pairs of support slide rails, fixed to the bottom surface, wherein the two pairs of support slide rails respectively correspondingly support the pair of protecting covers.

5. The charging station according to claim 1, further comprising:
    an infrared transmitter, disposed on the parking ramp and configured to emit an infrared light signal to control the landing of the drone.

6. The charging station according to claim 5, wherein the infrared transmitter is configured to confirm that the at least two charging stands of the drone are located in the at least two openings, and then, the protecting cover move relative to the pair of charging plates to expose the pair of charging plates.

7. The charging station according to claim 1, wherein each of the pair of the protecting covers has a light-absorbing layer on a top surface thereof facing the parking surface.

8. A charging system for a drone, comprising:
    a drone, having an infrared receiver; and
    a charging station, comprising a parking ramp, a pair of charging plates, a pair of protecting covers, at least an actuating device and an infrared transmitter, wherein the parking ramp has a parking surface and a bottom surface, the parking surface has at least two openings, the pair of charging plates are fixed to the bottom surface, the pair of protecting covers are disposed between the bottom surface of the parking ramp and the pair of charging plates, the pair of protecting covers respectively cover the pair of charging plates at the at least two openings, the at least one actuating device is fixed to the bottom surface and connected to the pair of protecting covers, and the infrared transmitter is disposed on the parking ramp,
    when the drone lands on the parking ramp after the infrared receiver of the drone receives the light signal emitted by the infrared transmitter, and after the drone stands still on the parking surface and at least two charging stands of the drone contact the pair of protecting covers, the at least one actuating device drives the pair of protecting covers to move relative to the pair of charging plates to expose the pair of charging plates, so that the at least two charging stands of the drone contact the pair of charging plates to charge.

9. The charging system for the drone according to claim 8, wherein the at least one actuating device comprises an actuator and a linking rod, and the linking rod is connected between the actuator and the protecting cover.

10. The charging system for the drone according to claim 9, wherein the actuator is a motor or a pneumatic cylinder.

11. The charging system for the drone according to claim 8, wherein the charging station further comprises two pairs of support slide rails fixed to the bottom surface, and the two pairs of support slide rails respectively correspondingly support the pair of protecting covers.

12. The charging system for the drone according to claim 8, wherein each of the pair of the protecting covers has a light-absorbing layer on a top surface thereof facing the parking surface.

13. The charging system for the drone according to claim 8, further comprising
    a control unit, electrically connected to the infrared transmitter and the at least one actuating device to control the infrared transmitter to emit an infrared light signal and control the at least one actuating device to operate.

14. The charging system for the drone according to claim 13, wherein after confirming that the at least two charging stands of the drone are located in the at least two openings through the infrared transmitter, the control unit controls the protecting covers to move to expose the pair of charging plates from the at least two openings.

15. A charging method, adapted to a charging system for a drone and a charging station, wherein the drone has an infrared receiver, the charging station comprises a parking surface having at least two openings, a bottom surface, a pair of charging plates fixed to the bottom surface, a pair of protecting covers disposed between the bottom surface and the pair of charging plates, at least one actuating device fixed to the bottom surface and connected to the pair of protecting covers and an infrared transmitter, comprising:
  respectively covering the pair of charging plates at the at least two openings by the pair of protecting covers;
  receiving a light signal emitted by the infrared transmitter by the drone and landing the drone on the parking surface, wherein the infrared transmitter is disposed on the charging station;
  driving the pair of protecting covers to move relative to the pair of charging plates to expose the pair of charging plates by the at least one actuating device after the drone stands still on the parking surface and at least two charging stands of the drone contact the pair of protecting covers; and
  contacting at least two charging stands of the drone by the pair of charging plates and charging the drone.

16. The charging method for the drone according to claim 15, wherein the drone charging system further comprises a control unit, wherein
  the control unit is electrically connected to the infrared transmitter and the at least one actuating device to control the infrared transmitter to emit an infrared light signal and control the at least one actuating device to drive the pair of protecting covers to move relative to the pair of charging plates to expose the pair of charging plates.

17. The charging method for the drone according to claim 16, wherein after the control unit confirms that the at least two charging stands of the drone are located in the at least two openings by the infrared transmitter, the protecting covers are controlled to move to expose the pair of charging plates from the at least two openings.

18. A charging station, adapted to park a drone for charging, comprising:
  a parking ramp, having a parking surface and a bottom surface, wherein the parking surface has an opening;
  a pair of charging plates, fixed to the bottom surface;
  a protecting cover, disposed between the bottom surface of the parking ramp and the pair of charging plates, wherein the protecting cover covers the pair of charging plates at the opening; and
  at least one actuating device, fixed to the bottom surface and connected to the protecting cover,
  wherein after the drone stands still on the parking surface and at least two charging stands of the drone contact the protecting cover, the at least one actuating device drives the protecting cover to move relative to the pair of charging plates to expose the pair of charging plates, so that the at least two charging stands of the drone contact the pair of charging plates to charge.

* * * * *